United States Patent [19]

Schoeneck

[11] Patent Number: 5,543,699
[45] Date of Patent: Aug. 6, 1996

[54] RANDOM INFEED TIMING DEVICE AND METHODS

[75] Inventor: Richard J. Schoeneck, Garfield, Minn.

[73] Assignee: Douglas Machine Limited Liability Company, Alexandria, Minn.

[21] Appl. No.: 250,013

[22] Filed: May 27, 1994

[51] Int. Cl.⁶ .............................. G05B 5/01; B65G 47/31
[52] U.S. Cl. .................. 318/616; 318/3; 198/347.1; 198/435; 198/465.1
[58] Field of Search .................................... 198/461, 577, 198/436, 347.1, 594, 465.1, 435; 318/6, 615, 616, 3

[56] References Cited

U.S. PATENT DOCUMENTS

| | | |
|---|---|---|
| 510,626 | 12/1893 | Zeller . |
| 1,766,142 | 6/1930 | Olson . |
| 1,777,996 | 10/1930 | Reckhard . |
| 1,879,944 | 9/1932 | Muth . |
| 1,901,928 | 3/1933 | Olson . |
| 3,466,835 | 9/1969 | Temple . |
| 3,592,323 | 7/1971 | Ross . |
| 3,647,044 | 3/1972 | Orstam . |
| 3,672,485 | 6/1972 | Walters . |
| 3,825,106 | 7/1974 | Wickam et al. . |
| 3,993,189 | 11/1976 | Khoylian et al. ........................ 198/465 |
| 4,027,458 | 6/1977 | Goodman . |
| 4,502,587 | 3/1985 | Clark .................................... 198/347.1 |
| 4,549,647 | 10/1985 | Coose . |
| 4,779,715 | 10/1988 | Pazdernik . |
| 4,867,299 | 9/1989 | Fukuoka et al. ........................ 198/435 |
| 5,113,992 | 5/1992 | Sadamori . |
| 5,271,489 | 12/1993 | Helmstetter . |

*Primary Examiner*—John W. Cabeca
*Attorney, Agent, or Firm*—Peterson, Wicks, Nemer & Kamrath, P.A.

[57] ABSTRACT

A device (10) is disclosed including a discharge unit (54) having a vertical conveyor (56) formed by a pair of vertically arranged belts (58) each including circumferentially spaced shelves (60) defining a plurality of evenly spaced flights. A diverting conveyor (16) is pivotally mounted about its infeed end so that its outfeed end can be moved to be synchronous with one of the flights of the discharge unit (54) or to an overflow position. In particular, a servo motor (50) pivots the diverting conveyor (16) under the control of a controller (74) depending upon whether product is detected by a sensor (52) in the diverting conveyor (16), upon the rate that the flights of the discharge unit (54) are moving, and upon the pivotal position of the diverting conveyor (16). The device (10) is then able to place products which are fed to the diverting conveyor (16) with random spacing into the flights without bumping or bunching the products together.

18 Claims, 2 Drawing Sheets

RANDOM INFEED TIMING DEVICE AND METHODS

BACKGROUND

The present invention generally relates to devices and methods for placing products which are infed at random spacing into consistent spacing and particularly for placing randomly spaced products into evenly spaced flights.

Many products are produced in a random fashion in that the spacing between the products on an output conveyor can vary from zero to a maximum. However, many production machines such as cartoning machines require the products to be positioned at consistent intervals. With many products such as rigid containers, bottles and cans, the products which are randomly fed are allowed to bump into each other, are bunched together and then mechanically separated to the desired consistent intervals. However, other products which are randomly fed can not be allowed to bump together for various reasons. For example, large flat products such as pizzas will have a tendency to ride up on one another such that damage may occur and/or mechanical separation is not possible. Other products having similar problems would be deformable products such as loose products contained in plastic bags and the like.

Thus, a need exists for devices for placing products which are infed in a random fashion into consistent intervals. It is an aim of the present invention to provide a random infeed timing device which does not bump or bunch the products together while placing the products at consistent intervals.

SUMMARY

The present invention solves this need and other problems in the field of timing randomly fed products by providing, in the most preferred form, methods and device for simultaneously moving randomly infed product in a feed direction from an infeed end to an outfeed end and in a first direction perpendicular to the feed direction to be synchronized with one of a plurality of evenly spaced flights moving in the first direction.

It is thus an object of the present invention to provide methods and device for placing product which are fed at random spacing into consistent spacings.

It is further an object of the present invention to provide such random infeed timing methods and device which do not bump product together.

It is further an object of the present invention to provide such random infeed timing methods and device which do not bunch product together.

It is further an object of the present invention to provide such random infeed timing methods and device which do not require mechanical separation of the product.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
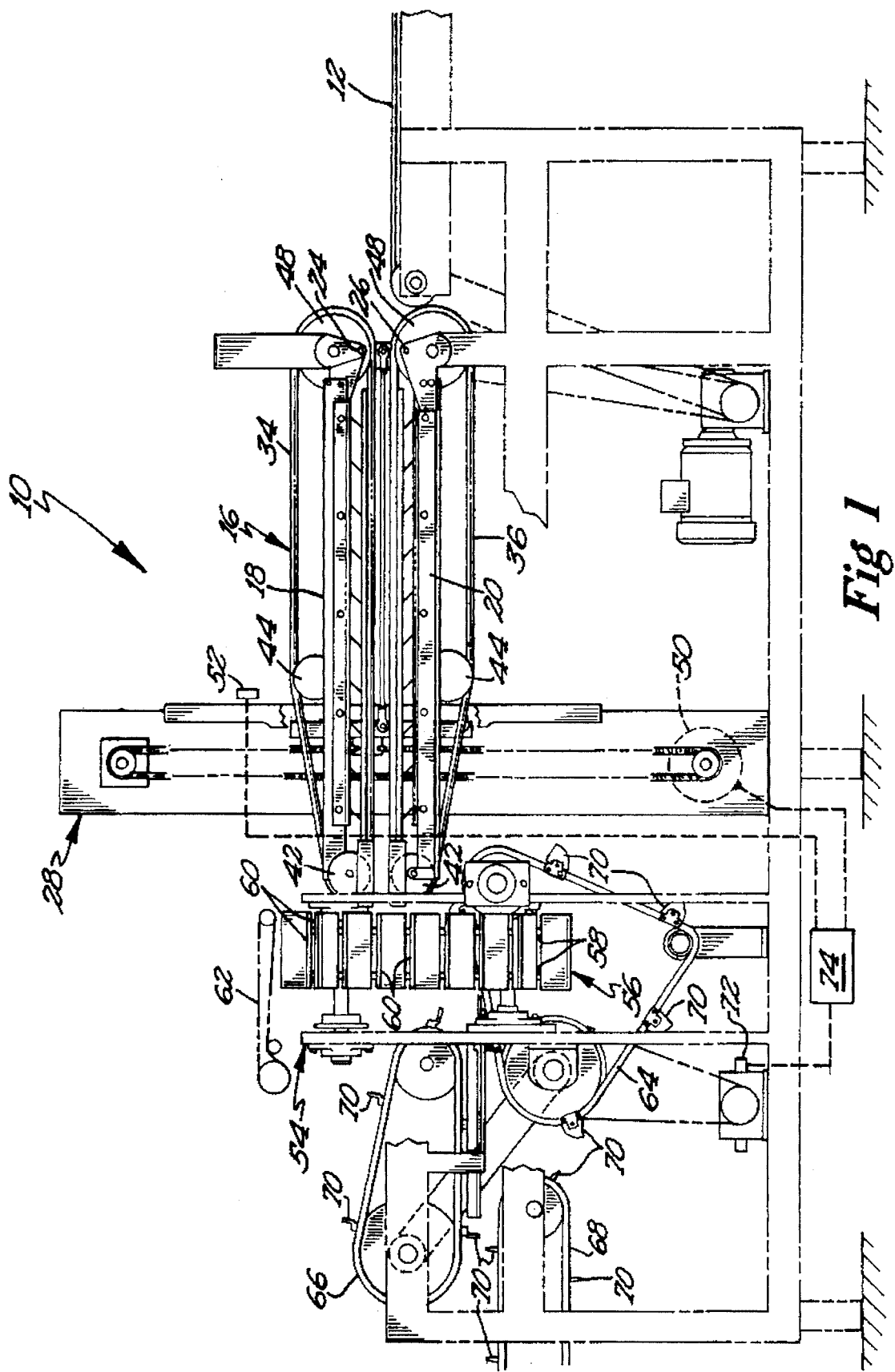
FIG. 1 shows a diagrammatic view of a device for placing randomly spaced products into evenly spaced flights utilizing the methods according to the preferred teachings of the present invention.
Figure 2:
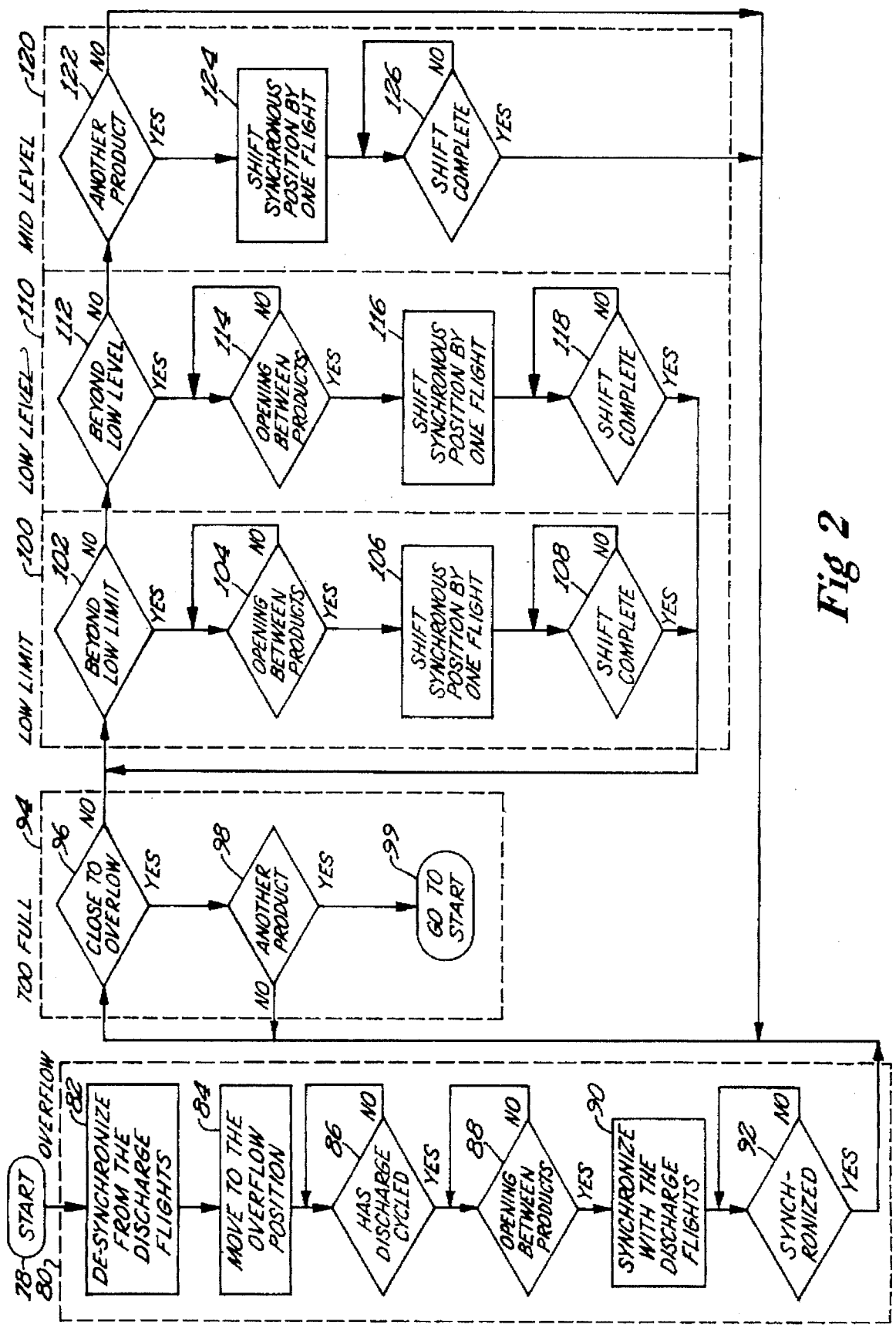
FIG. 2 shows a flow diagram of the program used in the device of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

where used in the various figures of the drawings, the same numerals designate the same or similar parts. Furthermore, when the terms "top", "bottom", "first", "second", "inside", "inner", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the invention.

DESCRIPTION

A device for placing randomly spaced products into evenly spaced flights according to the preferred teachings of the present invention is shown in the drawings and generally designated 10. Generally, device 10 includes an infeed conveyor 12 for receiving product such as from the outlet of a product fabrication apparatus or the like, with the product being randomly spaced upon conveyor 12.

Device 10 according to the preferred teachings of the present invention further includes a diverting conveyor 16 of a general construction of the type as shown in U.S. Pat. No. 4,779,715. Specifically, diverting conveyor 16 includes first and second divider arms 18 and 20. The first, infeed ends of arms 18 and 20 are pivotably mounted about fixed, spaced, parallel, and horizontal axes 24 and 26, respectfully. In the most preferred form, conveyor belts 34 and 36 are provided for continuously carrying products along the inside faces of arms 18 and 20, respectively. The inside faces of arms 18 and 20 may include members for resiliently supporting belts 34 and 36 thereon such as spring loaded slides. In the most preferred form, belts 34 and 36 are carried and driven by idler pulleys 42 and 44 and by drive pulleys 48. First idler pulleys 42 are rotatably mounted to the outfeed ends of arms 18 and 20 and direct belts 34 and 36 adjacent the inside faces of arms 18 and 20. Second idler pulleys 44 are located intermediate pulleys 42 and 48 adjacent the outer faces of arms 18 and 20 and spaced from the inside faces of arms 18 and 20.

In the most preferred form, axes 24 and 26 are spaced a distance generally for movably capturing and carrying product between belts 34 and 36 of arms 18 and 20. Belts 34 and 36 are driven together by any suitable means.

Arms 18 and 20 are pivoted about axes 24 and 26 in a generally parallel manner by reciprocating the second, outfeed ends of arms 18 and 20. In the most preferred form, arms 18 and 20 are pivotally mounted to a transport mechanism 28 adjacent to their second, outfeed ends, with the outfeed ends of arms 18 and 20 being movable in a movement direction generally parallel to a line extending perpendicularly between axes 24 and 26. Transport mechanism 28 can take a variety of forms such as a reciprocating chain driven by a servo motor 50. It can be appreciated that arms 18 and 20 are pivotally mounted in a parallelogram arrangement.

According to the teachings of the present invention, belts 34 and 36 are driven at linear speeds greater than the linear speed of infeed conveyor 12. Thus, product leaving infeed conveyor 12 as it enters diverting conveyor 16 will increase its spacing from the next product on infeed conveyor 12 due to the differences in speed between conveyors 12 and 16 such that spacing will be insured between products in conveyor 16. According to the teachings of the present invention, a sensor 52 is provided to detect whether product is located in diverting conveyor 16.

Device 10 according to the preferred teachings of the present invention includes a discharge unit 54 having evenly spaced flights. According to the preferred teachings of the present invention, discharge unit 54 includes a conveyor 56 arranged parallel to the movement direction of the outfeed ends of arms 18 and 20 which is vertical in the most preferred form. Conveyor 56 generally includes a pair of spaced endless belts 58 each having a plurality of circumferentially spaced shelves 60 having a width less than one half of the spacing between belts 58. Belts 58 are driven by any suitable means so that both belts 58 move at the same speed with shelves 60 synchronized to be horizontally aligned when located between belts 58.

Discharge unit 54 in the most preferred form further includes an overflow, recirculating conveyor 62 spaced in the movement direction of the outfeed ends of arms 18 and 20 which is vertical in the most preferred form from conveyor 56.

Discharge unit 54 in the most preferred form also includes first and second unloading conveyors 64 and 66 and an output conveyor 68, with conveyors 64, 66, and 68 including outwardly extending lugs 70 for holding product at desired intervals. Unloading conveyors 64 and 66 remove product from vertical conveyor 56 by sliding the product horizontally from shelves 60 and place the product onto output conveyor 68, with lugs 70 maintaining the desired product spacing as created by vertical conveyor 56. Output conveyor 68 then transports the product in the evenly spaced flights for further operations such as cartoning.

Discharge unit 54, and in the most preferred form conveyors 56, 62, 64, 66, and 68, is typically driven by the machines downline, such that product delivered by discharge unit 54 matches the input rate of the downline machines. Thus, discharge unit 54 is driven at a variable rate from zero to maximum. In the most preferred form, a suitable sensor 72 is provided to determine the speed of discharge unit 54.

Although discharge unit 54 of the most preferred form is shown and described as conveyors 56, 62, 64, 66, and 68, it can be appreciated that discharge unit 54 can take other forms and constructions including portions which perform further operations on the product.

Device 10 according to the teachings of the present invention further includes a controller 74 which controls transport mechanism 28 and in particular servo motor 50 thereof in the most preferred form. Controller 74 then moves divider arms 18 and 20 depending upon the conditions sensed by sensors 52 and 72 and the position of divider arms 18 and 20 of diverting conveyor 16.

Generally, the operation of device 10 according to the teachings of the present invention is as follows. Product is conveyed on conveyor 12 at random spacings varying from zero to a maximum. Product is fed from infeed conveyor 12 to the infeed end of diverting conveyor 16, with the increased speed of diverting conveyor 16 increasing the spacing of the product in diverting conveyor 16 from the next product on infeed conveyor 12. This spacing between product must be sufficient to allow diverting conveyor 16 to pivot to be synchronized with the next available flight in discharge unit 54 after the first product is placed in discharge unit 54 and prior to the next product leaving the outfeed end of diverting conveyor 16 and being placed in discharge unit 54. The product is captured between belts 34 and 36 and moves in a feed direction in diverting conveyor 16. Diverting conveyor 16 is pivoted such that the outfeed end thereof moves in the first direction to be in a synchronous position to match with a pair of shelves 60 of belts 58. After the product is sensed in diverting conveyor 16, diverting conveyor 16 is pivoted such that the outfeed end is in a synchronous position and moves at the same rate as generally the next available pair of shelves 60 if a further product is sensed by sensor 52 in diverting conveyor 16 or moves to a home position if a further product is not sensed. In the event that a flight is not available in discharge unit 54 such as in the event that diverting conveyor 16 has been pivoted adjacent the upper end of vertical conveyor 56, vertical conveyor 56 has stopped, or the like, diverting conveyor 16 is pivoted to an overflow position with the outfeed end aligned with recirculating conveyor 62. Diverting conveyor 16 is only pivoted from the overflow position when product is sufficiently spaced in diverting conveyor 16 from the outfeed end to allow diverting conveyor 16 to be pivoted and synchronized with vertical conveyor 56 before any product in diverting conveyor 16 reaches the outfeed end.

The program controlling diverting conveyor 16 in the microprocessor within controller 74 as shown in the drawings is started as indicated at 78 to move divider arms 18 and 20 to a home position to re-zero their absolute position. The program continues to the overflow logic 80. In the overflow logic 80, divider arms 18 and 20 are de-synchronized if synchronized with the discharge flights of discharge unit 54 as indicated at 82 and move to the overflow position aligned with recirculating conveyor 62. Divider arms 18 and 20 indicated at 84 wait at the overflow position until the discharge flights of discharge unit 54 have cycled as indicated at 86. Next, the program utilizing sensor 54 waits until there is an opening between infeed products in which to move divider arms 18 and 20 as indicated at 88. Then divider arms 18 and 20 synchronize with the discharge flights of discharge unit 54 as indicated at 90. Once synchronized, the program continues to the too full logic 94.

In the too full logic 94, the program checks the position of divider arms 18 and 20 as indicated at 96. If divider arms 18 and 20 are at a position which is too close to the overflow position as indicated at 96, then the discharge flights of discharge unit 54 are too full as indicated at 98. If too full and there is another product, then the program jumps to the overflow logic 80. If too full and there is not another product then synchronization is maintained, and the program Jumps to the too full logic 94 as indicated at 99. If not too full, then the program continues to the low limit logic 100.

In the low limit logic 100, the program again checks the position of divider arms 18 and 20 as indicated at 102. If divider arms 18 and 20 are at a position which is beyond the low limit position, then divider arms 18 and 20 are at a low limit. If at the low limit position, then divider arms 18 and 20 wait in synchronization until there is an opening between infeed products in which to move as indicated at 104. Then divider arms 18 and 20 will shift its synchronous position by two discharge flights of discharge unit 54 as indicated at 106.

When the shift is done as indicated at 108, the program jumps to the low limit logic 100. If divider arms 18 and 20 are not at the low limit position, then the program continues to the low level logic 110.

In the low level logic 110, the program again checks the position of divider arms 18 and 20 as indicated at 112. If divider arms 18 and 20 are at a position which is beyond the low level position, then divider arms 18 and 20 are at a low level. If at the low level position, then divider arms 18 and 20 wait in synchronization until there is an opening between infeed products in which to move as indicated at 114. Then divider arms 18 and 20 will shift synchronous position by one discharge flight in discharge unit 54 as indicated at 116. When the shift is done as indicated at 118, the program Jumps to the low limit logic 100. If divider arms 18 and 20 are not at the low level position, then the program Jumps to the mid level logic 120.

In the mid level logic 120, the program utilizing sensor 52 checks whether a product is present in diverting conveyor 16 as indicated at 122. If there is a product detected, then divider arms 18 and 20 will shift synchronous position by one discharge flight in discharge unit 54 as indicated at 124. When the shift is done as indicated at 126, the program jumps to the too full logic 94. If there is not a product detected, then synchronization is maintained, and the program Jumps to the too full logic 94.

It can then be appreciated that under normal operating conditions of device 10 according to the teachings of the present invention, the program will loop through logics 96, 102, 112, and 122. Specifically, controller 74 controls the movement of divider arms 18 and 20 to move synchronously with one of the flights of discharge unit 54 and to move in a direction opposite to the movement of the flights of discharge unit 54 which is vertically upward in the preferred form at times when a product is not being transferred from diverting conveyor 16 to discharge unit 54 as sensed by sensor 52. Thus, controller 74 positions diverting conveyor 16 under normal operating conditions between the low-level and the overflow position and particularly between the low-level and the mid-level position relative to conveyor 56 of the preferred form. Product is transferred from between divider arms 18 and 20 to the flights of discharge unit 54 when diverting conveyor 16 is moving synchronously with one of the flights of discharge unit 54.

Now that the basic teachings of the present invention have been explained, many extensions and variations will be obvious to one skilled in the art. As set forth hereinbefore, although discharge unit 54 as shown simply conveys the product in equally spaced flights, discharge unit 54 could perform further operations on the products. For example, vertical conveyor 56 could include a device for erecting, setting up, or otherwise receiving a carton such that diverting conveyor 16 places the product into a carton positioned in the spaced flights.

Similarly, although shelves 60 of conveyor 56 defining the flights of discharge unit 54 of device 10 according to the preferred teachings of the present invention move in a vertical direction and diverting conveyor 16 is pivoted in a vertical plane and are believed to be advantageous at least due to the minimization of floor space required, discharge unit 54 can be of other forms, constructions, and orientations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for timing randomly infed product comprising, in combination: a discharge unit having evenly spaced flights moving in a first direction at a rate; a diverting conveyor having an infeed end and an outfeed end, with the infeed end receiving the randomly infed product, with the outfeed end being movable in the first direction; and means for moving the outfeed end of the diverting conveyor to be synchronized with one of the flights of the discharge unit dependent upon the presence of product in the diverting conveyor.

2. The device of claim 1 further comprising, in combination: an overflow conveyor spaced from the discharge unit in the first direction, with the moving means moving the outfeed end of the diverting conveyor to be aligned with the overflow conveyor if the product can not be placed in one of the flights of the discharge unit.

3. The device of claim 2 Wherein the moving means comprises, in combination: a servo motor; means for drivably connecting the servo motor to the outfeed end of the diverting conveyor; and means for controlling the servo motor dependent upon the presence of product in the diverting conveyor.

4. The device of claim 3 wherein the rate that the flights move is variable; and wherein the controlling means includes means for sensing the rate that the flights move for controlling the servo motor.

5. The device of claim 1 wherein the first direction is vertical.

6. The device of claim 5 wherein the diverting conveyor is pivotable about the infeed end.

7. The device of claim 1 wherein the infed product is conveyed to the diverting conveyor at a speed; and wherein the diverting conveyor has a speed greater than the speed of the infed product to space the product in the diverting conveyor.

8. The device of claim 1 wherein the diverting conveyor comprises, in combination: first and second conveyor belts spaced a distance for movably capturing and carrying the product therebetween.

9. The device of claim 1 wherein the moving means comprises, in combination: a servo motor; means for drivably connecting the servo motor to the outfeed end of the diverting conveyor; and means for controlling the servo motor dependent upon the presence of product in the diverting conveyor.

10. The device of claim 9 wherein the rate that the flights move is variable; and wherein the controlling means includes means for sensing the rate that the flights move for controlling the servo motor.

11. Method for timing randomly infed product comprising the steps of: moving evenly spaced flights in a first direction at a rate; providing means for moving the product in a feed direction generally perpendicular to the first direction and for simultaneously moving the product in the first direction while the product is moving in the feed direction; and sensing the presence of the product in the feed direction to move the product in the first direction to synchronize the product with the flights.

12. The method of claim 11 further comprising the step of providing means for recirculating the product, with the moving means feeding the product to the recirculating means in the event that product can not be placed in one of the flights.

13. The method of claim 12 wherein the rate that the flights move is variable; and wherein the method further comprises the step of sensing the rate that the flights move to control movement of the product in the first direction.

14. The method of claim 13 wherein the first direction is vertical and the second direction is horizontal.

15. The method of claim 11 wherein the providing step comprises the steps of: providing a diverting conveyor having an infeed end and an outfeed end; and pivoting the infeed end about an axis which is perpendicular to the feed and first directions.

16. The method of claim 11 further comprising the step of feeding the product to the moving means at a speed less than the speed the product is moved in the feed direction to space the product in the moving means.

17. The method of claim 11 wherein the providing step comprises the step of providing first and second conveyor belts spaced a distance in the first direction for capturing and carrying the product therebetween.

18. The method of claim 11 wherein the rate that the flights move is variable; and wherein the method further comprises the step of sensing the rate that the flights move to control movement of the product in the first direction.

* * * * *